United States Patent [19]

Hecht

[11] Patent Number: 5,705,008

[45] Date of Patent: Jan. 6, 1998

[54] FIBER-REINFORCED CARBON AND GRAPHITE ARTICLES AND METHOD FOR THE PRODUCTION THEREOF

[75] Inventor: Daniel H. Hecht, Duluth, Ga.

[73] Assignee: Amoco Corporation, Chicago, Ill.

[21] Appl. No.: 685,163

[22] Filed: Jul. 23, 1996

Related U.S. Application Data

[62] Division of Ser. No. 286,550, Aug. 5, 1994, Pat. No. 5,654,059.

[51] Int. Cl.$^6$ ............................... D05B 3/00; B32B 31/10
[52] U.S. Cl. ............................................. 156/148; 28/107
[58] Field of Search .................... 156/148; 28/107

[56] References Cited

U.S. PATENT DOCUMENTS 5,338,320   8/1994   Smith et al. ................ 29/419.1

*Primary Examiner*—Richard Weisberger
*Attorney, Agent, or Firm*—Richard J. Schlott; Stephen L. Hensley

[57] ABSTRACT

The present invention relates to the fabrication of thick, three-dimensional structures comprising discontinuous thermoset pitch fiber, and to composites comprising such structures embedded in a matrix material such as a thermoset resin, ceramic, metal or carbon. Carbon-carbon fiber composite articles produced from porous carbon preforms obtained by carbonizing such structures followed by infiltration with pyrolytic carbon using CVD processes exhibit surprisingly high through-thickness thermal conductivity and isotropic properties.

9 Claims, No Drawings

FIBER-REINFORCED CARBON AND GRAPHITE ARTICLES AND METHOD FOR THE PRODUCTION THEREOF

This is a divisional of application Ser. No. 08/286,550, filed Aug. 5, 1994, now U.S. Pat. No. 5,654,059.

BACKGROUND OF THE INVENTION

This invention relates to carbon fiber-reinforced composites, and more particularly to composites comprising carbon fiber reinforcement embedded in a carbon, thermoset resin, metal or ceramic matrix. The composites are formed by infiltrating a porous preform comprising carbonized pitch fiber with the matrix component or a precursor thereof, whereby the matrix component is deposited throughout the structure. Carbon-carbon fiber composites exhibiting unusually high thermal conductivity may be formed by depositing carbon within the interstices of the porous preform by infiltration of the preform using known carbon vapor deposition techniques, or by impregnation of the preform with pitch or a carbonizable resin which then is cured and carbonized. Further heat treatment of the carbon-carbon fiber composites may be used to graphitize the carbon components. As used herein, the term "carbon" is intended to include both ungraphitized and graphitized carbon. Thus, carbon fiber preforms and reinforcement may comprise graphitized, partially graphitized or ungraphitized carbon reinforcing fibers or a mixture thereof, and carbon-carbon fiber composites comprising such reinforcement embedded in a matrix of graphitized, partially graphitized or ungraphitized carbon.

The present invention is particularly concerned with carbon-carbon fiber composites intended for use in applications where sever shear stresses will be encountered, for example, by being subjected to circumferential stress. A prime example of such use is a friction disc employed in a disc brake. Such discs are essentially annular in shape, having at least one surface of each disc being provided with a friction-bearing surface. Braking is accomplished through contact between the friction-bearing surfaces of the discs, thereby converting the mechanical energy of the rotating portion of the brake to heat. In addition to withstanding the shearing stresses, the discs thus also are required to act as heat sinks, dissipating high heat loads. Because of its strength, density, heat capacity, thermal conductivity, coefficient of friction and stability to its sublimation temperature (about 3600° C.) carbon has been particularly attractive for use in constructing such disc brakes, particularly where weight is a major consideration such as in aircraft.

In the prior art, composites have generally been fabricated by orienting or directionally aligning the carbon fiber component, which generally has been thought necessary in order to take advantage of fiber strength and enhance mechanical properties of the composite. Fabricating the composite with the desired fiber orientation is more readily accomplished by use of continuous carbon fiber, and such fiber has been preferred over discontinuous fiber for these applications. The primary forms of continuous fiber employed in composite fabrication include woven textile fabric or unidirectional tapes for use in lay-up structures, and continuous fiber yarn or tow, which are used for filament winding and in braided structures. For example, in a commonly-used process for producing carbon composite brake components, annuli are cut from sheets of PAN-based graphite cloth or unidirectional tape, coated with a suitable binder, stacked and then heated suitably to carbonize the binder. However, variations in binder thickness lead to uneven expansion and contraction during the curing and the resulting composite has set up within it internal stresses which may cause cracking and stress failure in use. Alternative processes designed to overcome such problems are also widely used. For example, a layered stack formed from dry fabric annuli may be infiltrated with vapor-deposited carbon to bind the carbon fibers into a rigid structure suitable for impregnation with a carbonizable binder.

Prior art structures formed from stacked fabric or the like necessarily have the reinforcing fiber distributed within and aligned along each of the planes formed by the fabric layer. The interlayer spaces, lacking fiber reinforcement, generally exhibit lower strength than the fabric layers. Some form of reinforcement is thus needed to improve interlayer strength and thereby avoid or reduce failure through delamination.

Needlepunching is widely used in the textile arts to strengthen stacked fabric structures and improve structural integrity. Generally described, needlepunching operations are carried out by forcing barbed needles normally through the stack layers in the thickness direction. A portion of the fiber within the fabric layers is gathered by the barbs and repositioned in the thickness direction, reinforcing the individual fabric layers as well as the stack. The fiber making up the layers is continuous, hence the needlepunching operation necessarily breaks individual filaments when re-orienting them. To avoid or at least minimize such breakage, improved processes wherein staple fiber is included within the structure, either as part of the fabric layer or as alternating layers of staple fiber sheet, have been used to supply staple fiber to the needles for re-orienting in the needlepunching operation. Needlepunching operations have been employed in the art with carbon fiber sheet and tape to provide preform structures having good integrity for use in the production of carbon-carbon fiber reinforced composites.

As noted, uniformity in the carbon-carbon fiber composite structure has been considered important to the integrity and strength of the product, and the art has continually attempted to develop improved methods for providing uniformity in the preform component. Uniform needlepunching, both in terms of evenly-spaced needles and controlled depth of the needlepunching, has been thought to be important to the uniformity of the product. One widely accepted approach to achieving a high degree of control in constructing preforms from layered fabric or tape has been to needle each of the layers to the layer below as it is added. Prior art methods, such as those disclosed in U.S. Pat. No. 4,621,662 and in U.S. Pat. No. 4,955,123, take great care to emphasize the importance of using just such needlepunching procedures, even to the extent of applying the needlepunching to the fabric at the point of contact with the underlying layer as the fabric is wound on a mandrel. More recently, in U.S. Pat. No. 5,217,770, there is disclosed a process of forming a braided, continuous tube from continuous fiber tow or yarn which then is flattened into a tape and layered to form an annular structure, each layer being needle punched as it is added.

The needlepunching process has also been applied to layering fabric sheet formed of carbon fiber and coated with carbonizable binders, which may include conductive particulate or fibrous filler. Needlepunching the stack is said to aid penetration of the liquid binder into the interstices of the fabric layers. Distributing the binder and the carbon fiber in the thickness direction by needlepunching provides, after a carbonizing step, reinforcement of the carbon matrix which may improve resistance to delamination.

The needled preform structures are used as substrates for depositing carbon matrix material, thereby providing reinforcement for the matrix carbon in the carbon-carbon fiber reinforced composite. Known vapor deposition techniques may be used to infiltrate and deposit pyrolytic carbon on the fibrous carbon skeleton. Chemical vapor deposition of carbon and impregnation with carbonizable binders have also been used in combination. A substrate formed of layers of fibrous carbon fabric or similar material thus may first be infiltrated with vapor-deposited carbon to bond the fibrous materials, then impregnated with carbonizable filler material, cured and carbonized to provide the dense, fiber-reinforced carbon article. These and other processes are well known and widely disclosed in the art.

As noted, the high degree of fiber alignment within the structure of these prior art composites is intended to take advantage of the strength and dimensional stability of the carbon fiber. However, composites having the entire fiber content aligned in a single direction would necessarily be highly anisotropic in character, exhibiting a high degree of strength and dimensional stability in the fiber direction while suffering greatly reduced strength properties and poor dimensional stability in the transverse direction. To ensure that the strength of the composite, as well as its heat transfer characteristics and other important mechanical properties, will be reasonably uniform and to minimize unidirectional shrinkage which may cause warping and distortion, the fiber direction will be varied throughout the structure, imparting some isotropic character to the composite. When using fabric or the like, the fabricator has had to resort to varying fiber orientation between successive layers of the structure, for example, using radial orientation in one layer, chordal in the next, and so on, thereby providing a composite having characteristics termed quasi-isotropic. As described above, three-dimensional weaving, needlepunching and similar operations are necessarily employed to add through-thickness fiber orientation and improve interlayer strength properties. However, a preform with fully isotropic character in the fiber reinforcement continues to be difficult to attain.

Current methods for producing carbon-carbon fiber reinforced composites exhibit further shortcomings. For most applications, finished carbon parts generally are made to precise dimensions, and their production requires conducting extensive shaping and machining operations on carbonized or fully graphitized carbon-carbon fiber composite blanks. Precision machining operations are expensive to carry out and difficult, and great care is needed with carbon-carbon fiber composites to avoid cracking or other damage. Carbon blanks having substantially the finished shape and dimensions, termed net shape blanks, would reduce the extend of machining needed and significantly lower costs. However, carbonized preforms are generally friable and cannot be readily formed or shaped. Constructing shaped preforms from layered fabric or fiber sheet thus generally requires cutting component parts having the desired final shape from fabric sheet before stacking and needlepunching. Such cutting operations are wasteful and produce considerable quantities of scrap fabric. Even when suitable methods for recycling of the scrap are found, the production and re-processing of scrap further increases the energy and waste disposal burdens already imposed on the manufacturing process, significantly raising the overall cost of producing the carbon article.

Methods for producing carbon-carbon fiber reinforced preform structures from staple or chopped carbon fiber are also disclosed in the art. For example, in U.S. Pat. No. 4,297,307 there is described a process for extruding a thickened or gelled slurry or dispersion of cut carbon fiber in liquid medium such as water to form an elongated ribbon. The liquid medium may include a carbonizable polymeric binder to bind the fiber component on drying. The elongated ribbon is then arranged in a circular pattern to form a flat disc, and dried to remove the water. The orienting effects of the fluid flow in the thickened medium during extrusion permit aligning or orienting the fiber along the flow line, resulting in very low density, non-woven, discontinuous fiber discs with circumferential fiber orientation. The dried disc may be heated and, if appropriate, carbonized. A plurality of the resulting thin, low-density discs may be stacked to provide the necessary thickness and then subjected to infiltration or impregnation operations as described and carbonized or graphitized to produce carbon discs for use in brakes or the like. As with other layered structures lacking interlayer fiber reinforcement, the resulting layered carbon disc will be subject to delamination failure.

Methods for forming non-woven webs of carbon fiber have also been disclosed in the art, for example in U.S. Pat. No. 4,032,607. According to patentees, particularly attractive webs may be formed from mesophase pitch by melt- or blow-spinning the pitch, air-layering or water-layering the resulting fiber either as-spun or after being chopped, and thermosetting or air-oxidizing the non-woven web to stabilize the structure before carbonizing. Generally, the resulting webs are composed of random filaments rather than filament bundles or tow, and take the form of low density, thin felts and papers with very low bulk densities, generally well below about 0.3 g/cc. Non-woven webs may be suitable for use in forming layered carbon-carbon fiber structures in the same manner as continuous fiber tape and fabric by employing prior art layering and needlepunching operations such as those described herein above. Even after the needlepunching, structures comprising such highly randomized filaments generally will have a low fiber volume and consequently a very low density. Such structures would not provide the strength advantages generally obtained when using dense, high fiber volume structures comprising aligned and oriented continuous fiber, either in woven textile form or as unidirectional fiber tape.

Preform structures fabricated from cut or chopped fiber heretofore available in the art generally are also low in density and lack the mechanical strength necessary for use in carbon-carbon fiber composites. Methods for fabricating suitable carbon-carbon fiber composites with a high fiber volume from discontinuous fiber are unknown in the art, and the carbon composite industry is thus forced to rely primarily on preforms fabricated from oriented and aligned continuous fiber in order to produce carbon-carbon fiber reinforced composites having the strength properties desired for use where high levels of mechanical stress are encountered. Such prior art composites generally also are deficient in heat transfer properties, particularly in the out-of-plane or thickness direction, further limiting their utility.

A method for fabricating thick preforms and carbon-carbon fiber composite blanks having adequate strength properties and good thermal characteristics from cut or chopped fiber, preferably in a net shape and avoiding the use of binders and liquid carriers that add further to the energy and disposal burdens on the manufacturing process, would be particularly valuable to the carbon composites art.

BRIEF SUMMARY OF THE INVENTION

Dense, porous carbon preforms having a three-dimensional fiber structure suitable for use as reinforcement in the manufacture of composites and particularly desirable for use in producing high-strength, high thermal conductivity carbon-carbon fiber reinforced composites may be produced by needlepunching a thick, low-density, mat formed of discontinuous thermoset pitch fiber through the thickness, preferably normal to a surface. The needlepunching serves to increase the density of the structure and to re-orient a portion of the fiber in the thickness direction to improve integrity and strength characteristics. The preform may conveniently be produced directly from fiber as a net-shape preform having the general overall shape of the final product, together with dimensions needed to accommodate such shrinkage as may occur during subsequent thermal treatment. The net-shape process minimizes the scrap production and concommitant waste encountered in prior art processes for fabricating textile fabric, sheet and tape, and reduces the need for extensive machining and forming operations.

The invented preform will generally consist entirely of carbonized fiber and, though made without resort to binders or the like, the mechanical strength of the preform will be adequate to withstand subsequent carbon composite manufacturing operations including infiltration with pyrolytic carbon or impregnation with a carbonizable filler and subsequent carbonization. The preform may also have application in the manufacture of carbon fiber-reinforced thermoset resin matrix, metal matrix and ceramic matrix composite structures.

A dense carbon-carbon fiber composite may be readily produced by depositing pyrolytic carbon within the invented preforms using well-known chemical vapor deposition processes and infiltration operations generally known and widely employed in the composite art. Alternatively, the preform may be impregnated with a carbonizable filler, cured under pressure and heat, and then further heated to carbonize the filler together with any pitch fiber component present, thereby providing a dense carbon-carbon fiber composite. Multiple infiltrating or impregnating operations may be employed if needed to produce a product having the desired density, and the processes may be used in combination.

DETAILED DESCRIPTION

A porous, thick, three-dimensional carbonized fiber preform suitable for use in the manufacture of high strength carbon-carbon fiber composites may be made from thermoset pitch fiber according to the invention without application of a binder or an impregnant.

Carbon fibers have long been known, and methods for their production from a variety of precursors are well described in the art. Cellulosic precursors have been used for producing carbon fiber since the early 1960's, with rayon being the dominant carbon fiber precursor for nearly two decades. More recently, as the art have developed methods for producing carbon fiber derived from such materials as polyacrylonitrile (PAN) and pitch, the importance of rayon-based carbon fiber has declined. Polyacrylonitrile fiber, when oxidized and carbonized under appropriate conditions, provides tough, high strength, high modulus carbon fiber, and the overall conversion yield in producing fiber from PAN is good. Consequently, PAN fiber has been long preferred for fabricating preform structures.

Carbon fiber may also be readily produced from a mesophase pitch by spinning the molten pitch into fiber, oxidizing the pitch fiber by heating in air to form a thermoset fiber, and carbonizing by further thermal treatment in the absence of air. As is well known and understood in the art, the melt-spun pitch filaments are highly ordered structures comprising elongated, liquid crystal mesophase domains aligned with the filament axis. On carbonizing, these domains provide carbon or graphitic fiber with a high degree of crystalline order. Such highly ordered pitch-based fiber has generally been recognized as capable of providing carbon fiber having greater stiffness and higher thermal conductivity than carbon fiber from other sources, and carbon composites with a similar combination of properties and low or even negative coefficient of thermal expansion would find wide application. Moreover, thermoset mesophase pitch fiber is carbonized and graphitized in higher yield than other carbonizable precursor fibers such as rayon fibers, PAN fibers and oxidized PAN fibers, i.e., thermoset pitch fiber undergoes less reduction in weight when thermally processed. This in turn may lead to reduced shrinkage during carbonizing and graphitizing operations and minimize the concomitant creation of voids and internal stresses normally encountered with other fiber precursors. For these reasons, thermoset pitch fiber will be found particularly useful and desirable for use in the practice of this invention.

Preferably the thermoset pitch fiber will be employed in the form of a chopped tow or yarn. The fiber length of the chopped tow will be greater than 0.5 inch, preferably greater than 1 inch in length, depending upon the intended thickness of the finished part. Desirably, the fiber length will lie in the range of from about 1 inch to as great as about 6 inches, preferably comprising a mixture of varying lengths within the specified range, with a nominal or average length of about 2 inches. Continuous fiber tow ordinarily comprises a plurality of filaments, usually from 1000 to 20,000 or more and may even exceed 300,000, with the axially-aligned filaments providing strength in the fiber direction of the tow. The entanglement of the individual filaments making up the tow desirably maintains filament alignment, even when the tow is chopped. Filaments that are very short, particularly less than about 0.5 inch to 1 inch in length, tend to become disentangled and cause the tow to open up and separate readily into individual filaments, particularly during subsequent handling such as in fabrication operations, needlepunching and the like. Conversely, chopped tow having long fiber lengths, particularly lengths considerably greater than the intended thickness of the preform, are difficult to reorient using needlefelting techniques without causing fiber damage.

As will be subsequently described in greater detail, shaped mats comprising loose, discontinous thermoset pitch fiber will be formed using molds or the like. The filling operation employed will be more effective to impart some degree of flow orientation to the chopped tow when longer tow lengths are used. For optimum benefit, the tow length will preferably be selected to be greater than the intended thickness of the preform, and preferably about twice the preform thickness. When re-oriented by the needlepunching operation, the longer filaments may serve to provide greater reinforcement by extending through the mat in the thickness direction with a portion of the tow length maintaining useful entanglement with filaments lying in the plane of the mat.

While the fiber may be substantially dry, preferably the thermoset pitch tow will be sized before being chopped using a conventional aqueous sizing formulation, and more preferably the sized tow will be used directly from the sizing bath without being dried, thus retaining from 20 to 35 wt % of the sizing carrier liquid as moisture. The use of wet tow will provide a mat for needlepunching having a similar moisture content. Mats with lower moisture contents are bulky and more difficult to densify in the needlepunching operation, while high moisture content causes the fiber to be difficult to chop and may cause the fiber to stick to the needle shafts during the needlepunching operations, thereby removing fiber from the mat and clogging the needle barbs and apparatus.

The thermoset pitch fiber will be fabricated into a porous, three-dimensionally reinforced preform. Preferably, the fiber will be formed into a thick, low-density mat having the general shape of the part, with the discontinuous fiber oriented within the plane of the mat. Through-thickness reinforcement will then be added in a subsequent needlepunching operation. The preform will thus be produced in the general shape of the final product, avoiding the need for cutting and shaping operations and thereby minimizing the substantial waste normally associated with such steps.

In forming the low-density mat structure for use in the needling operation, means such as a cavity mold or similar assembly are supplied to form the discontinuous fiber into a mat having the desired shape and to constrain the mat during the needlepunching. For example, where the intended use for the carbon article is as a brake disc or similar object, the means for holding the fiber may take the form of a cavity mold having an annular shape including substantially flat or planar faces. The mold, which may be formed of any convenient material having sufficient mechanical strength to support and constrain the fiber mat, will have at least one wall or face open to admit fiber, as well as to permit carrying out the needlepunching operation. Alternatively, the mold may be fitted with a removable closure, and the closure, as well as other walls, may be formed of a material that will permit piercing in the needlepunching operation without loss of mechanical integrity, for example, a fugitive material such as scrim, perforated or foam sheet or screen. Cavity molds of appropriate construction described in the art and known for use in holding or fixturing layered structures and stacks formed of segments cut from fabric sheet or the like for needlepunching operations may be suitably adapted for use in fabricating preforms according to the instant invention.

The wet thermoset pitch fiber tow will be chopped, fed to the mold cavity and distributed uniformly therein at the desired depth to take the form of the mold cavity, thereby forming a mat of loose, discontinuous fiber. The tow may conveniently be chopped and fed directly to the mold in a continuous stream while advancing the mold at a speed that will deposit and distribute the fiber without causing unstable stacking. Means such as a chute or the like, as well as guide vanes, may be employed to direct the fiber stream into the mold, and these may be also be effective to selectively orient the fiber in particular areas such as nearest a mold wall.

Because of the shape and substantial length of the fiber, the mode of adding and distributing the chopped fiber tow will serve to orient the fiber to lie generally in the horizontal plane of the mold, much as is found for the fiber component of non-woven webs obtained in paper-making processes, and little if any fiber will be found oriented in an out-of-plane direction. For the purposes of further discussion, in describing the resulting structure, the mold plane will be designated as the x-y or in-plane orientation or direction, and the z orthogonal direction will be understood to be the direction normal thereto, also termed the through-thickness direction.

It is preferred that the chopped tow be deposited in a manner that will provide uniform areal weight, giving a fiber mat having a density in the range of 0.3 to about 0.6 g/cc, preferably from about 0.4 to about 0.5 g/cc. While mats with densities outside these ranges may be useful in some applications, generally low-density mats having densities below about 0.3 g/cc are very light, almost fluffy structures. Such mats generally require considerable compaction in order to attain the bulk densities needed for most preform applications, which usually causes severe fiber damage. Mats with densities greater than about 0.6 g/cc are difficult to achieve without including continuous fiber in the form of braided fiber, tape, fabric or the like, thus increasing fabrication expense. As will be further discussed below, uniformly needlepunching dense mats and structures comprising continuous fiber is difficult and results in considerable breakage of fiber and needles, and hence will desirably be avoided.

Some density variation in the structure may be desirable. Higher densities at the intended wear surfaces are preferable in order to provide improved structural strength and integrity, and may also be effective in helping to reduce friability in the intermediate preform structure. Inasmuch as oriented fiber permits achieving greater densities through improved packing, it may be desirable that a substantial portion of the fiber nearest the mold wall be given an orientation of approximately 0° with respect to the mold wall. Completely random fiber orientation, particularly close to mold walls, reduces the ability of the fiber to pack well and necessarily results in the lowest density. Such preforms and the resulting carbon-carbon fiber composite structures lack adequate strength for many applications, particularly where lugs or other load-bearing features are to be provided at the part edges as an integral part of the composite.

Close fiber packing increases the mat density, effectively reducing porosity and making infiltration more difficult: hence it is preferred that fiber in the bulk of the structure and away from mold walls lie in the x-y plane in a more randomized, less oriented configuration and give the mat more in-plane isotropic characteristics. Preferably, the fiber will lie in the mold plane and have an average orientation desirably on the order of ±45°, although orientations as great as ±75° in the bulk of the mat may also be found acceptable for use in some less demanding applications. Fiber orientations greater than about 45° tend to reduce circumferential strength while orientations of less than about 15° tend to lower the radial shear strength of the resulting composite, hence such extreme orientations will not be preferred for most applications. Again, the fiber will preferably have a substantially planar orientation with respect to the x-y plane, the orientation descriptions being set forth and described with respect to the nearest mold wall or walls that intersect the x-y plane such as, for example, a wall defining the periphery of an annular or disc preform.

It is important that any variation in the orientation of the chopped tow not occur abruptly or discontinuously, thereby creating bands containing fiber with a single orientation, but rather that the transition be continuous and gradual. Bands comprising fiber having a very narrow or single orientation and with few bridging fibers internally or extending into adjoining areas may cause sever delamination and other structural failures by concentrating stress within a narrow region of the structure and preventing the redistribution of the imposed stresses throughout the structure.

In an alternative embodiment, fiber may be supplied to the mold cavity in continuous form, in a manner that will distribute the continuous fiber filaments uniformly within the cavity and provide a mat having a density in the desired range. For example, it is known that fiber may be distributed in layered fashion to form mats by employing a sort of piddling motion about the mold central axis when feeding the continuous fiber strand. As noted, the needlepunching operation will tend to break the continuous fiber to provide random lengths of tow for reinforcement in the through-thickness direction. Hence the use of continuous fiber in such constructions will not be preferred.

The low-density mat produced in the initial operation will generally have a thickness in the range of from about ½ inch to about 4 inches, preferably from about ¾ inch to about 3 inches for most applications. Mat thickness will be limited in part by practical considerations. In particular, the mat is intended to be further modified to provide three-dimensional reinforcement in a needlepunching operation. Such needling operations generally require the use of needles of a length sufficient to penetrate from 90 to 100% through the thickness of the mat. For mats with excessive thickness, the force needed to penetrate to the desired depth may result in frequent needle breakage. In addition, needles able to penetrate to depths of 4 inches and more are generally not available from commercial sources and must therefore be custom made, adding to the cost of preform fabrication.

Needling operations are conventional in the non-woven textiles art, and generally are practiced using a plurality of needles comprised of a shank having outward-projecting barbs. The needles are mounted to permit their use in tandem in the needling operation, the needlepunching being accomplished by moving the needles normally with respect to the mat surface, and in a reciprocating manner, thereby forcing the needles repeatedly into the mat. The barbs catch fiber in passing through the mat, causing a portion of the fibers in the mat to become aligned vertically. In practice, the presence of fiber size together with a high level of moisture benefits the needlepunching operation by aiding needle penetration and, perhaps by acting as a lubricant for the fiber substrate, assisting the reorienting of fiber tow in the needle direction.

For the purpose of this invention, the needles will preferably be selected to be of sufficient length to pierce the low density mat substantially through, preferably from 80 to 95% through, more preferably about 90% through, the mat in the needled direction. The needle density will be selected to provide vertical fiber orientation at densities adequate for reinforcement of the preform in the thickness direction. In the practice, the needles will be set at spacings of from 0.9 to 1.2 cm on center.

Typically, in operation a portion of the filaments making up the chopped tow will be caught by the barbs and reoriented as filament bundles in the z or thickness direction. The portion of the filaments not caught by the barbs will be displaced laterally within the x-y plane by the needles, creating openings through the structure to the depth of the needling. The needlepunching thus serves to redistribute the fiber by separating the fiber tow into smaller filament bundles and by randomizing the fiber orientation within the x-y plane through lateral displacement of the filament bundles. The filament bundles created by the needlepunching will vary widely in number of filaments, depending upon the initial makeup of the fiber tow and on the level of needlepunching employed. Structures comprising filament bundles with from 25 to 1000 filaments will be readily produced, while structures with bundles having as few as 10 to 75 filaments or bundles comprising from 250 to as many as 20,000 may also be observed.

For the purposes of this invention, the needles will be selected to be of a size that will afford vertical openings of significant size, generally of sufficient diameter to accommodate the filament bundles displaced into the opening by being reoriented in the needlepunching operation and provide substantial free space surrounding the displaced tow for subsequent infiltration of matrix material. When carbonized, the structure will then have openings extending substantially through the structure and will exhibit high porosity. When infiltrated or impregnated with matrix material, columns of matrix material with embedded filaments will be formed extending substantially through the thickness of the composite. When viewed from the z direction, the cross-sectional area within the columns occupied by matrix material will be seen to be preferably at least twice, more preferably greater than four times, that occupied by the fibers.

By contrast, prior art processes produce needled carbon fiber preforms from layered PAN fiber fabric or unidirectional tape by needlepunching each layer to the underlying layer. The needles are selected to be thin and are closely-set, often at densities of 30 per square inch and greater, and are intended to give the least disturbance to the fiber alignment and avoid displacement of the fiber tow, other than the fraction of the fiber that becomes reoriented in the needling. Each layer is needled as it becomes superposed on the layer below, and fiber is displaced in the vertical direction, reinforcing only adjoining layers. Ordinarily in these prior art processes the needlepunching is applied only to the two adjacent layers, or at the most only a few layers are included, and fiber alignment in the thickness or z direction is thus discontinuous. Moreover, the openings in the needled layers that result from lateral fiber displacement are minimal and nearly completely filled with displaced fiber. When carbonized, the resulting preforms will thus lack passages through the structure and the passages will have little free space, and will thereby exhibit a lower porosity. In order to provide openings in such prior art structures that are continuous and extend through more than the two or three needled layers, it would be necessary to precisely align the needlepunching for each of the superposed layers, a very difficult process to carry out successfully.

The needlepunching operation is preferably accomplished by piercing in a direction normal to the surface of the mat structure. However, where the low density mat structure has a curvilinear outer surface or where particular fiber orientations are desired, piercing may be accomplished at angles other than normal to the surface, and piercing angles as great as about 45° to the surface may be usefully employed.

To attain greater uniformity in the needled structure, particularly for mats and similar substantially planar structures, it may be desirable to needle punch the structure from both faces by inverting the structure and presenting the opposing face for additional needlepunching operations. As will be better understood by way of being exemplified herein below, when combined with controlled variation in the depth of the needlepunching, the technique of needlepunching from both faces also affords means for controlling the degree of reinforcement within the structure, thus providing structures having different levels of reinforcement through the thickness.

The repeated piercing in the needlepunching operation serves to compact and thereby densify the structure to some degree while at the same time spreading, randomizing, and reorienting fiber within the plane of the disc. This working of the fiber tow further randomizes the fiber, smoothing the progression in fiber orientation between adjacent areas and minimizing discontinuities. As noted, the needles employed are selected to provide openings or channels of significant size through the mat, with reoriented tow filaments extending through the channels. The large channels increase the effective porosity of the structure and provide improved access to the interior of the mat, increasing the level of carbon deposition that can be accomplished in subsequent carbon infiltration operations or for impregnation with suitable carbon precursor materials. The improved porosity is particularly beneficial in the production of thick parts, generally greater than 1 inch, because during the infiltration of low porosity preform structures with the matrix component, such as, for example, CVD carbon, deposition tends to occur at the surface layers, blocking further densification within the interior of the structure.

The needlepunching operation will generally reduce the initial thickness of the fiber mat by from 10 to 40%, depending upon the degree of needlepunching applied. For most applications the level of needlefelting employed will be sufficient to reorient substantial quantities of fiber, thereby giving the structure three-dimensional reinforcement and may result in isotropic property characteristics. The strength properties and preform integrity will be significantly improved through needlefelting, permitting subsequent handling including storage, packaging and shipping, as well as use in impregnating and infiltration operations without requiring further fixturing.

The needle-punched thermoset pitch fiber preform will generally be carbonized to provide a porous carbon structure or preform for use in the infiltration or impregnating and carbonizing operations used to complete the production of a high-strength, fiber-reinforced carbon or graphite composite article. Carbonizing processes such as are commonly employed in the art for such structures may be used for these purposes. Generally, the preform may be carbonized without the need for fixturing by heating in an inert, non-oxidizing atmosphere at a heating rate selected on the basis of the size of the preform and the materials of construction. Heating rates in the range of from about 25° to 50° C. per hour up to the final temperature are commonly employed in the art, and the preform may be held at a selected final temperature for varying periods of from several minutes to several hours to complete the carbonization, the time depending upon the degree of carbonization desired. Such processes will be familiar to those in the carbon-carbon fiber art. For most preforms from thermoset pitch fiber precursors, the carbonizing operation will result in a shrinkage in the range of 3–8%. The carbonized preforms generally will have a nominal bulk density in the range 0.4 to 0.7 g/cc.

In an alternative embodiment, the preform structure may be altered to meet particular needs by including fiber that will be consumed in the carbonizing operation, termed fugitive fiber, or by providing non-fusible fiber or particulates within the intersticies. One method for accomplishing such variant structures will be to furnish the mat with a top layer of discontinuous, possibly highly-crimped, fugitive fiber prior to conducting the needlepunching, whereby a substantial portion of the fiber that does become reoriented in the through-thickness direction by the needlefelting operation will consist of such fiber. Upon subsequent carbonizing, the fugitive fiber will be lost and the porosity thereby increased.

The porous carbon structures of this invention, when embedded in any of a variety of matix materials, including thermoset resins, metals, carbon and ceramics, provide particularly attractive composites. A great variety of thermoset resin systems and formulations suitable for use as matrix resins in the manufacture of carbon fiber reinforced composites are known and readily available from commercial sources, including epoxy resins, cyanate resin, phenolic resins, bismaleimide resins and the like, as well as mixtures and reactive intermediates based thereon. Most such thermoset resins, when formulated to be liquid at the application temperature and with a viscosity sufficiently low for impregnation of porous matricies, will be found to be useful with the porous carbon structures of this invention in producing composites. Similarly, methods and processes for infiltrating porous carbon bodies with molten metals, including copper, aluminum, tin, silver, nickel and the like, as well as alloys such as brass, have been developed and are widely known in the composite arts and these methods may be employed with the porous carbon preforms of this invention for producing metal matrix composites. Methods for accomplishing the infiltration of a variety of porous structures with ceramic materials and precursors, including silica, silicon carbide and silicon nitride as well as with a variety of other nitrides, oxides and the like are well described in the art, and these also may be suitably adapted for use with the carbon preforms of this invention to provide ceramic-carbon fiber composites.

When used for producing carbon-carbon fiber composite, the porous carbon structure will be subjected to infiltration operations, for example, the pyrolytic deposition and infiltration processes commonly employed in the carbon composite art. Generally, the operations are conventional, and may be accomplished in any suitable vapor deposition furnace having a temperature range of between about 700° C. to about 1900° C. For example, pyrolytic carbon may be deposited from a carbonaceous gas such as methane, ethane, butane, or propane which disassociates under the influence of heat. The carbonaceous gas is preferably diluted with an inert gas, for example nitrogen or argon, to facilitate penetration of the article. Generally a ratio of from about 1 part by volume of carbonaceous gas to about 10 parts by volume of inert gas is suitable to use. A ratio of from about 1:1 to about 1:6 has been found eminently useful. The carbonaceous gas may be fed into an evacuated furnace and in such case the diluent gas may be eliminated or the amount of inert gas used can be considerably reduced.

The period of time needed to effectively infiltrate the shaped porous carbon structure depends upon various factors such as the structure's volume, density, structural shape, fiber size and fiber orientation as well as on the flow rate of the gas, the deposition temperature and the furnace pressure. These variables may be empirically determined according to the common practice in the art for the manufacture of carbon composites. After vapor infiltration, the assembly is allowed to cool and, if desired, the process will be repeated to further increase the carbon content and the density of the carbon composite article.

Alternatively, the porous carbon preform may be pressure impregnated with a suitable carbonizable filler material, such as pitch or a carbonaceous resin. The article may then be pressure cured, and, after curing, baked using a protective atmosphere of nitrogen at atmospheric pressure. During the baking operation, the temperature of the body is gradually raised from the curing temperature to about 800° C. The rate of temperature increase is largely a function of the size of the article to be baked. Large articles may require a slower rate of temperature increase than smaller articles in order that the temperature be uniform throughout the article, thus avoiding harmful internal stresses that are caused by uneven heating of the article. After completion of the impregnating, curing and baking steps, the shape may again be placed under vacuum and reimpregnated, cured and baked. The number of impregnation, curing and baking cycles is determined by the density that is desired in the finished article.

After completion of the desired number of impregnation, curing and baking steps, the article may be carbonized or graphitized. Thermal treatment may be conducted in a single heating step or in stages to a temperature in the range of 1200°–3500° C. to produce carbonized and graphitized carbon articles of this invention. The heat treatment will be conducted in a substantially non-reactive atmosphere to ensure that the article is not consumed. The non-reactive atmosphere may be nitrogen, argon or helium; however, for temperatures above about 2000° C., argon and helium are preferred. Although the non-reactive atmosphere may include a small amount of oxygen without causing serious harm, particularly if the temperature is not raised too rapidly, the presence of oxygen should be avoided. In addition, wet yarn structures will produce an atmosphere of steam when heated, which should be purged from the furnace before carbonizing temperatures are reached inasmuch as steam is highly reactive at such temperatures. It may be desirable to include boron or similar graphitizing components in the furnace atmosphere and these will be regarded as non-reactive as the term is used herein.

The heating of the preform may be carried out as a single step process or, alternatively, conducted in a series of steps or stages, with cooling and storage of intermediate materials such as filled preforms and carbonized structures for further processing at a later time. The final temperature of the heat treatment will be determined primarily by the end use application. For example, where it is envisioned the article will encounter extreme temperatures, the heat treatment may be conducted to very high temperatures, 2600° C. and greater, and even to temperatures approaching 3500° C. for applications where a high degree of graphitization is desired. The heat treatment may be carried out with or without applying external pressure to assist the compaction and afford high density composites.

It will be readily understood by those skilled in the art that the particular thermal processing to be employed will be determined with respect to the size and geometry of the part that is being produced. For large parts, heat conduction into the center of the part will necessarily be slow, and long heating cycles and slow increases in temperature may be desirable.

Although it is within the scope of this invention to produce reinforced carbon-carbon fiber or graphitized articles with lower density, for example under 1.4 g/cc, the preferred density range will lie in the range of from about 1.6 to about 2.1 g/cc. Carbon-carbon fiber composites according to the invention will have excellent thermal conductivity, due in substantial measure to the use of pitch-based fiber in fabricating the fiber preforms. The particular thermal conductivity observed will depend in part on the final carbonizing temperature, which in turn determines the degree of graphitization. When carbonized at a temperature of greater than 2000° C., composites having a density greater than 1.6 g/cc and comprising the carbonized preforms embedded in a carbon matrix according to this invention may have a thermal conductivity greater than 80 watts/m °K. in the through-thickness direction.

The invention will be better understood by consideration of the following specific examples illustrating more clearly the exact manner in which the processes of the present invention may be carried out. The examples are provided by way of illustration only, and are not to be construed as limiting the scope of the invention to the particular process details or articles illustrated.

EXAMPLE 1

A mold cavity was constructed by forming a 6" diameter circular opening through a 2" thick polyethylene foam sheet, closing one end of the opening by affixing a sheet of Graphfoil at one face of the foam sheet, and affixing a 3.5" diameter cylinder of the foam to the Graphfoil within the cavity and axially aligning it at the center. The cavity was first lined with polypropylene scrim, then filled uniformly with 282 g of chopped, 4000 filament, thermoset pitch fiber tow having a nominal 2" length to provide a loose fiber mat consisting of chopped fiber tow randomly oriented substantially along the plane of the mold at a nominal depth of 2". The mat was then needled normally to the surface with 100 reciprocating strokes in two passes over the surface, using a needled board having a randomized pattern of 216 Foster F20 8-32-5B 2B/E 15 18 25 3.5 SBA needles affixed at 1 needle per square centimeter. The thickness of the mat was reduced to 1.75" in the first pass, and to 1.56" in the second pass. Additional needling passes, to a total of six passes, were carried out, giving a final thickness of 1.375". After the third needling pass, the preform was inverted to permit needling from the reverse side. The porous preform was readily removed from the mold cavity, and had good strength and integrity. The bulk density of the preform was 0.628 g/cc. corresponding to a thermoset pitch fiber volume fraction of 0.458.

EXAMPLE 2

A disc-shaped mat, 18.5 cm in diameter and 4.5 cm in thickness, was formed by hand from 700 g of chopped, 4000 filament, thermoset pitch fiber tow having a nominal length of 1.5". The mat surfaces were covered with polypropylene scrim and secured about the circumference with polypropylene scrim held with strapping tape. A needle board having a randomized pattern of 216 Foster F20 8-32-5B 2B/E 15 18 25 3.5 SBA needles affixed at 1 needle per square centimeter was used to make 1300 penetrations per square inch (NPSI) at a depth of 90% of the mat thickness. The needle felting operation was applied from both sides thereby applying a total of 2600 NPSI to the center 80% of the thickness. The disc material spread slightly, making the disc 19.75 cm in diameter and 3.85 cm thick. The disk weighed 701 g and had excellent integrity and handling.

The disk was carbonized by heating in a nitrogen atmosphere, increasing the temperature at the rate of 50° C./hr to a final temperature of 1300° C. with a hold time of one hour at that temperature. After trimming to 16.5 cm diameter and 3.3 cm thickness, the disc weight 408 g, corresponding to a bulk density of 0.58 g/cc. The disc was infiltrated by CVD processing to vapor deposit carbon and provide a carbon-carbon fiber reinforced blank. The blank had a density of 1.65 g/cc in three CVD cycles. After a total of six such CVD cycles, the density was 1.85 g/cc.

EXAMPLE 3

A mold was constructed of aluminum to have a ring-shaped mold cavity of 13" outer diameter, 4" inner diameter and 2" in thickness, with a flat or planar bottom. The mold cavity was filled uniformly with 1440 g of 4000 filament, thermoset pitch fiber tow having a nominal 2" length by chopping the tow into the mold cavity, using a spiral feed motion to evenly distribute the fiber and provide a loose fiber mat with discontinuous thermoset fiber randomly oriented substantially along the plane of the mold at a nominal depth of 2". The face of the mat was covered with polypropylene non-woven scrim. A needle board having a radomized pattern of 49 Foster F20 8-32-5B 2B/E 15 18 25 3.5 SBA needles affixed thereto, the needles being arranged in an annular arc segment at 1 needle per square centimeter, was used to make 1300 penetrations per square inch (NPSI) at a depth of 90% of the mat thickness, followed by 1300 penetrations per square inch (NPSI) at a depth of 60% of the mat thickness. The needle felting operation was repeated after reversing the mat to expose the opposing face, thereby applying the needle felting equally from both sides. In each of the needling operations, the mold was radially-incremented up to 0.1" to randomize the needle penetrations. Registration per stroke was a radial movement of approximately 1°. A stripper plate fitted with an annular shoe contacting the face of the mat and sized to fit into the mold cavity was also employed. The stripper shoe was lowered into the mold as the mat became compacted during the needle felting operations.

The differential needling provided a disc wherein the center 20% of the thickness was exposed to a total of 5200 NPSI and the next 30% in each direction from the center to a total of 3900 NPSI, while the outer 10% nearest each of the faces received a total of 2600 NPSI. The resulting needled mat or annular preform had a thickness of 1.25" and a bulk density of 0.52 g/cc. The pitch fiber preform was carbonized, then infiltrated by CVD processing to vapor deposit carbon on the fiber and provide a carbon-carbon fiber reinforced blank. After a total of three CVD cycles, the bulk density was 1.79 g/cc.

EXAMPLE 4

A cavity mold similar in configuration to that employed in Example 3 but constructed from aluminum, PVC and fiberboard to provide a ring-shaped cavity 1.75" in depth with an outer diameter of 20.1" and an inner diameter of 8.25" was filled with 2" nominal length chopped, 4000 filament, thermoset pitch tow. The filling operation was accomplished using articulating chutes located at the inner and outer diameters of the cavity to receive the tow from the chopper and give the tow flow orientation by flowing in contact with the surfaces of the chute bottom and walls. The stream was fed to the mold as the mold was rotated, filling the mold to the desired depth in several passes. A plate in the form of an arc section was used to press the fiber into the mold cavity after each pass. By visual examination, the fiber lay generally in the x-y plane, the fiber nearest the walls of the mold cavity being aligned with the wall and becoming progressively randomized away from the mold walls to achieve a substantially random orientation in areas more than 1.5" from the walls.

The mat was needle punched substantially as described in Example 3, giving a handleable three-dimensionally reinforced thermoset pitch fiber preform. Upon carbonizing, the resulting porous carbon fiber preform had a nominal 0.53 g/cc density. On visual inspection, the surfaces at the inner and outer circumference of the disc had good integrity, with only the tows nearest the walls not integrated into the structure by the needlepunching operation.

EXAMPLE 5

The process of Example 2 was employed in forming five disc-shaped mats 2" in diameter and 1.1" in thickness. The mats were needled to 90% of the mat thickness using the needle configurations and procedures as in Example 2, but with varying levels of needlepunching, providing six thermoset pitch fiber preforms or test discs having needle penetration levels of 650, 1300, 2600, 3900, 5200 and 6500 NPSI from each face. The specimens were graphitized to a final temperature of 2600° C. to provide porous carbon fiber preforms. The preforms were impregnated with an epoxy resin by resin transfer molding and cured to provide carbon fiber-reinforced epoxy matrix composite blanks for test purposes. As is well understood in the art, the function of the epoxy matrix component of resin matrix composites is to serve as a binder for the fiber component. The mechanical properties of such composites, and particularly the thermal and compressive properties, are primarily a function of the properties of the fiber reinforcement.

Mechanical test specimens were machined from the discs for determination of compressive modulus in the in-plane (x/y axes) and in the thickness (z axis) directions using strain gauges. The modulus data are summarized in the following Table 1.

TABLE I

| Needlepunch Level (NPSI/side) | x-y Compressive Modulus | | z Compressive Modulus |
|---|---|---|---|
| | Ave (Mpsi) | Range (Mpsi) | Ave (Mpsi) |
| 650 | 2.8 | 1.6–3.7 | 0.5 |
| 1300 | 1.85 | 2.7–1.3 | 0.8 |
| 2600 | 1.8 | 2.0–1.6 | 1.0 |
| 3900 | 1.5 | 1.6–1.3 | 1.4 |
| 5200 | 0.9 | 0.8–1.0 | 2.2 |
| 6500 | 0.9 | 0.6–1.4 | 2.7 |

It will be seen that compressive modulus in the z or through-thickness direction for these carbon fiber reinforced epoxy composite test specimens increased linearly with the level of needlepunching, demonstrating the contribution to stiffness provided by the increased level of fiber having an axial or through-thickness orientation. In the in-plane or x-y direction, compressive modulus undergoes a corresponding decrease as the level of needlepunching increases.

The ability to attain a broad range of fiber orientations ranging from random to substantially isotropic distribution of fiber in a thick fiber reinforced composite structure is unique to the invented process. The use of discontinuous fiber having the appropriate lengths, determined as set forth herein, together with needlepunching to reorient and redistribute fiber and thereby provide uniform distribution of the oriented, discontinuous fiber within the structure, provides means for selectively configuring the fiber reinforcement to have any degree of orientation desired. This degree of flexibility will be of particular benefit for producing carbon fiber-reinforced composites tailored to meet specific requirements of a particular application. Prior art processes in which thick composites are constructed from continuous fiber generally produce quasi-isotropic, layered fiber structures. Even when complex prior art processes and equipment are used for needlepunching the thick, layered preforms to improve uniformity, the resulting composites lack true isotropic character and are unable to provide fiber reinforced composites with through-thickness compressive properties equal to or substantially greater than compressive properties measured in the in-plane direction without resort to three-dimensional weaving or the like.

EXAMPLE 7

A carbon-carbon fiber reinforced blank, prepared substantially as described in Example 2, was further carbonized by heating in nitrogen to a final temperature of 1800° C. The carbon-carbon fiber composite blank had a thermal conductivity of 109 watts/m °K., measured at 75° F. in the in-plane (x-y) direction, and a thermal conductivity of 100 watts/m °K. at 75° F., measured in the through-thickness or z direction. The thermal diffusivity was independently measured as 1.05 cm²/sec.

COMPARATIVE EXAMPLE B

A test specimen was cut from a commercial brake disc formed from prior art carbon-carbon fiber composite comprising a carbonized fabric infiltrated with CVD-deposited carbon. The test specimen was found to have a thermal conductivity of 4.6 watts/m °K., measured at 75° F. in the through-thickness direction. The thermal conductivity in the in-plane (x-y) direction was 12.8 watts/m °K., measured at 75° F. The carbon-carbon fiber composite of the prior art will thus be seen to exhibit a high degree of anisotropy in thermal properties.

EXAMPLE 8

A disc-shaped mat 50.8 cm in diameter and 3.2 cm thick, needled at 2600 NPSI, was prepared substantially by the process of Example 4. A plug cutter was used to cut ⅝th inch diameter cylindrical plugs through the thickness for use as test specimens. The level of porosity for the test plugs was approximated for comparison purposes by measuring the air flow through 6.4 cm of sample using a flow meter. The flow test was conducted by placing two such plugs, linearly disposed end-to-end, in a flow tube. Air was supplied to the flowmeter at an applied pressure regulated at 5 psig. The volumetric air flow through the apparatus was measured as 0.442 liters/min, corresponding to a flow at the 1.979 cm² face of the sample of 0.3619 liters/min. The unit resistance to flow was calculated to be 0.496 psi/liters/min-cm.

Test specimens with a thickness of 3.9 cm, cut from a disc carbonized to a final temperature of 1300° C. as described in Example 2, had a flow of 0.475 liters per minute at 5 psig, corresponding to a flow at the sample of 0.4286 liters/min and a flow resistance calculated of 0.144 psi/liters/min-cm.

COMPARATIVE EXAMPLE C

Plug specimens cut from a 3.2 cm thick carbon-carbon fiber composite according to the prior art comprising a needlepunched thermoset pitch fiber fabric stack needlepunched to a level of 2600 NPSI were tested for porosity level substantially as in Example 8. The flow was measured at 0.438 liters/min at 5 psig, corresponding to a flow at the sample of 0.3524 liters/min and a flow resistance calculated as 0.544 psi/liters/min-cm. Test specimens with a thickness of 2.6 cm, cut from a disc carbonized to a final temperature of 1300° C. as described in Example 2, had a flow of 0.470 liters per minute at 5 psig, corresponding to a flow at the sample of 0.4286 liters/min and a flow resistance calculated as 0.266 psi/liters/min-cm.

The differences between the prior art fiberous preform structures and the porous carbon fiber structures of the invention are thus made quite apparent. The use of large diameter needles and needlepunching through the thick structure according to the invented process creates substantial openings that extend continuously and substantially through the thickness of the invented porous carbon preforms, providing a high level of porosity and excellent access for infiltration with the matrix component. Thick carbon preforms constructed from layered fabric and needlepunching through the superposed layers as they are applied as taught by the prior art, when carbonized, will have few continuous pathways through the preform. Such prior art preforms exhibit much lower porosity and are thus much more difficult to infiltrate.

A remarkable further comparison is afforded by comparing the mechanical properties of the epoxy matrix composite of Example 5, constructed from the preform needled to a level of 1300 NPSI, and the carbon matrix composites of Example 7, also needled to a level of 1300 NPSI. In the epoxy matrix composite, the compressive properties are seen to be anisotropic, the x-y/z compressive moduli having a ratio of 2.31. The same carbon preform structure, when infiltrated with CVD carbon to form a carbon-carbon fiber composite as in Example 7, exhibits substantially isotropic thermal properties, the x-y/z thermal conductivities having a ratio of 1.09.

For comparison, consider the thermal data presented for the prior art composite of Comparative Example B, where the thickness or z direction thermal properties are seen to be generally much lower than the in-plane or x-y direction properties. Moreover, these prior art carbon-carbon fiber composites generally exhibit thermal conductivities in the thickness direction considerably less than about 70 watts/m °K., and thermal diffusivities generally below about 0.7 cm²/sec.

Prior art carbon-carbon fiber composites comprising a carbonized needlepunched PAN-based fiber fabric stack infiltrated with CVD-deposited carbon are disclosed to have even lower thermal diffusivities, generally in the range 0.2–0.3 cm²/sec. Also disclosed in the prior art are carbon-carbon matrix composites comprising a carbonized needlepunched pitch-based carbon fiber fabric stack infiltrated with CVD-deposited carbon, and these also have low thermal diffusivities, in the range 0.1–0.7 cm²/sec. The thermal history and level of graphitizing in these prior art carbon composite parts, and the orthogonal direction of the conductivity measurements, were not disclosed.

In composites formed from layered continuous fiber carbon fiber fabric or tape according to prior art practices, for example, those shown in FIG. 2, the continuous carbon fiber component of the fabric or tape may extend substantially through the composite in the x-y plane and thus may provide good thermal transfer pathways in the in-plane direction. However, such composites lack continuous crystalline carbon pathways extending through the thickness or z direction to provide thermal transfer pathways, and heat transfer between successive fabric layers of such composites is known to be poor. The thermal characteristics in the z or thickness direction for such composites, as shown by Comparative Example B, generally will be much lower than for the in-plane direction, giving the composite anisotropic thermal character.

Carbon-carbon fiber composite structures exhibiting substantially isotropic thermal properties, particularly at a high level of thermal conductivity, have not been disclosed in the art, and carbon-carbon fiber composites having thermal conductivities in the through-thickness direction as great as 70 watts/m °K. or greater, or with thermal diffusivities greater than 0.7 cm²/sec to as great as 1.0 cm²/sec or more, are unknown in the art. These surprising thermal properties are found only for carbon-carbon fiber composites produced according to the invention.

EXAMPLE 9

A carbonized preform was prepared and sectioned to provide test specimens substantially as described in Example 5. A test specimen, after being further carbonized by heating in an inert atmosphere to final temperature of about 1300° C., was infiltrated with molten copper to provide, on cooling, a copper-carbon fiber composite.

Other known processes for infiltration with a variety of matrix materials may be conveniently employed with the invented carbon preforms for providing nickel-carbon fiber composites, silver-carbon fiber composites or the like. Vapor deposition processes for infiltration with silicon carbide, metal nitrides and the like are also known in the art and these may also be adapted for use with the invented porous carbon preforms in providing still further variation in the composite matrix component. Useful composite materials may also be provided by employing a plurality of such techniques sequentially, thereby producing composites with matrix components comprising mixtures of metal, carbon and ceramic materials.

The product of the present invention is thus a porous carbon preform having three-dimensional reinforcement, the preform being fabricated from discontinuous thermoset pitch fiber by first forming a mat of the cut fiber or tow, then needlepunching to re-orient a portion of the fiber in the through-thickness or z direction. The needled structure is then carbonized to provide a highly porous carbon preform having a high degree of porosity; when compared on a flow resistance basis, carbonized preforms according to the invention having a bulk density greater than 0.5 g/cc will have a flow resistance generally below about 0.2 psi/liters/min-cm.

The invented porous carbonized preform structures may be employed as reinforcement in the production of composites comprising any of a variety of matrix materials including thermoset resins, metals, carbon or ceramic. Infiltration of the preform with CVD-deposited carbon, or impregnation with a carbonizable filler and carbonizing, provides carbon-carbon fiber composite articles having excellent thermal conductivity, generally greater than 70 watts/m °K., preferably greater than 100 watts/m °K., in the through-thickness direction and a thermal diffusivity greater than 0.7 cm²/sec, preferably greater than 0.9 cm²/sec. When viewed in the thickness direction, as in a cross-sectional view taken in the x-y plane, the invented structures generally will contain carbon filaments embedded in the matrix component, with the ratio of matrix to carbon fiber being greater than about 2, preferably greater than about 4, when determined as a ratio of the cross-sectional areas for the two components on an in-plane cross-section of the composite.

I claim:

1. A method for producing a fibrous preform comprising the steps of forming a mat of discontinuous thermoset pitch fiber having a length greater than about 0.5 inch, said mat having a thickness in a range of from about ½ inch to about 4 inches and a density in a range of from 0.3 to about 0.6 g/cc; and needle punching said mat substantially normal to a surface to form filament bundles and re-orient a portion of said filament bundles in the needled direction.

2. The method of claim 1 wherein said discontinuous thermoset pitch fiber is chopped multifilament tow having a nominal length in the range of from about 1 to about 4 inches.

3. The method of claim 1 wherein said discontinuous thermoset pitch fiber is chopped multifilament tow having a nominal length of about 2 inches.

4. A method for producing a fibrous preform comprising the steps of: providing shaping means for holding fiber; placing discontinuous thermoset pitch fiber having a length greater than about 0.5 inch into said shaping means and forming a mat having a thickness in a range of from about ½ inch to about 4 inches and a density of from about 0.3 to about 0.6 g/cc; needlepunching said mat substantially normal to a surface and at a needle density of from about 100 to about 10,000 per square inch to form filament bundles and re-orient a portion of said filament bundles in the needled direction, thereby providing a three-dimensional filamentary structure; and carbonizing said filamentary structure by heating in an inert atmosphere to a temperature greater than about 1000° C. to provide a porous carbon preform.

5. The method of claim 4 wherein said heating is conducted to a temperature in the range of from about 1200° to about 2200° C.

6. The method of claim 4 wherein said heating is conducted to a final temperature in a range of between about 2600° to about 3400° C., thereby substantially graphitizing said filamentary structure.

7. The method of claim 4 wherein said discontinuous thermoset pitch fiber is chopped, thermoset pitch fiber tow having a nominal length of from about 1 to about 4 inches, said tow being sized and having a moisture content of from about 20 to about 30 wt %.

8. The method of claim 4 wherein said porous carbon preform has a bulk density in the range 0.4 to about 0.7 g/cc.

9. The method of claim 4 wherein said preform has a bulk density greater than 0.5 g/cc and a unit flow resistance in the needled direction of less than about 0.2 psi/liters/min-cm.

* * * * *